United States Patent [19]

Sato

[11] Patent Number: 4,512,536
[45] Date of Patent: Apr. 23, 1985

[54] FISHING REEL

[75] Inventor: Jun Sato, Sakai, Japan

[73] Assignee: Shimano Industrial Company Limited, Osaka, Japan

[21] Appl. No.: 549,220

[22] Filed: Nov. 7, 1983

Related U.S. Application Data

[63] Continuation of Ser. No. 344,746, Feb. 1, 1982, abandoned.

[30] Foreign Application Priority Data

Feb. 9, 1981 [JP] Japan .................................. 56-17506

[51] Int. Cl.$^3$ .......................................... A01K 89/015
[52] U.S. Cl. .................................... 242/218; 242/220
[58] Field of Search ................... 242/84, 1 R, 211–221

[56] References Cited

U.S. PATENT DOCUMENTS

| 1,939,148 | 12/1933 | Spenny | 242/220 |
| 2,536,583 | 1/1951 | Tank | 242/211 |
| 3,171,609 | 3/1965 | Baenziger | 242/216 |
| 4,179,084 | 12/1979 | Noda | 242/212 |

Primary Examiner—Billy S. Taylor
Attorney, Agent, or Firm—Stevens, Davis, Miller & Mosher

[57] ABSTRACT

A fishing reel which supports a spool journalled to first and second side frames and is provided at the first side frame with a handle, a transmission mechanism having a clutch, and a clutch control mechanism having a clutch lever, the second side frame having a clutch operating member, so that the clutch operating member is operated in association with the clutch lever, thereby enabling an angler to operate the clutch operating member and in turn the clutch by his hand gripping the second side frame.

3 Claims, 5 Drawing Figures

FISHING REEL

This application is a continuation of application Ser. No. 344,746, filed Feb. 1, 1982, now abandoned.

FIELD OF THE INVENTION

This invention relates to a fishing reel, and more particularly to a fishing reel which supports a spool rotatably between first and second side frames so that a handle supported to the first side frame is turned to rotate the spool, thereby winding thereon a fishing line, and which provides a clutch at a transmission mechanism for transmitting rotation of the handle so that the clutch is disengaged by a clutch control mechanism to allow the spool to freely rotate.

BACKGROUND OF THE INVENTION

Conventionally, a fishing reel, which supports the spool rotatably between the first and second side frames, is called a double-bearing fishing reel and is well-known. This kind of fishing reel has, at the first side frame, the handle, transmission mechanism for transmitting rotation of the handle, and a clutch control mechanism. A clutch lever at the clutch control mechanism projects outwardly from the first side frame to form a clutch control. The clutch lever is operated to disengage the clutch to freely rotate the spool.

In other words, the first side frame supporting the handle is provided with the transmission mechanism and clutch control mechanism, so that an angler operates the handle and clutch control at a side of the first side frame.

The angler, when using the fishing reel constructed as above and mounted on a fishing rod, grips the second side frame together with the rod by his whip hand and rotates the handle by his other hand to wind the fishing line onto the spool and then performs casting, in which he must shift a grip of the whip hand on the second side frame in order to operate the clutch lever for the clutch disengagement, because the clutch lever control is provided at the first side frame.

When the angler turns the handle by his whip hand to wind-up the line and then tries the casting, he releases the handle and grips the first side frame and fishing rod to thereby operate the clutch lever, in which he must shift the grip of the whip hand.

In either case, the angler must shift the grip of his whip hand for casting, so that the casting is not simple and the grip of the whip hand on the side frame and rod becomes unsteady.

In detail, the angler, when gripping the second side frame by his whip hand, must stretch a finger thereof to operate the clutch lever, resulting in an unstable grip and a difficult lever operation. Also, when he operates the handle by his whip hand and then grips the first side frame together with the rod for casting, the handle hinders his steady grip.

SUMMARY OF THE INVENTION

An object of the invention is to provide a fishing reel which enables an angler to operate a clutch for casting by his hand (which is not used to operate the handle) gripping the second side frame and fishing rod, in which clutch operation he need not shift a grip of his hand, thereby performing a quick and easy casting and operating the clutch with ease while his hand steadily grips the side frame and rod.

The fishing reel of the invention is provided; at a first side frame with the handle supported thereto, a transmitting mechanism transmitting the rotation of handle to a spool and including a clutch, and a clutch control mechanism controlling the clutch in engagement or disengagement and including a clutch lever; at a second side frame opposite to the first side frame with a clutch control; and at the first and second side frames with an association mechanism for allowing the clutch control to associate with the clutch lever, so that the clutch control operates the clutch lever to enable the clutch disengagement.

The angler, when using the fishing reel of the invention, can, as abovementioned, operate the clutch with ease by his hand gripping the second side frame and fishing rod, without shifting the grip of his hand thereon.

Accordingly, he can perform casting in a posture of not shifting his grip after the handle operation, thereby avoiding the trouble of a shift of the grip, and permitting a stable casting while gripping the second side frame which carries no handle. Also, the clutch control, which is provided at the second side frame carrying no transmission and clutch control mechanisms, can be disposed at a desired position, resulting in easy control of the clutch.

These and other objects of the invention will become more appatent in the detailed description and examples which follow.

DETAILED DESCRIPTION OF THE INVENTION

Figure 1:
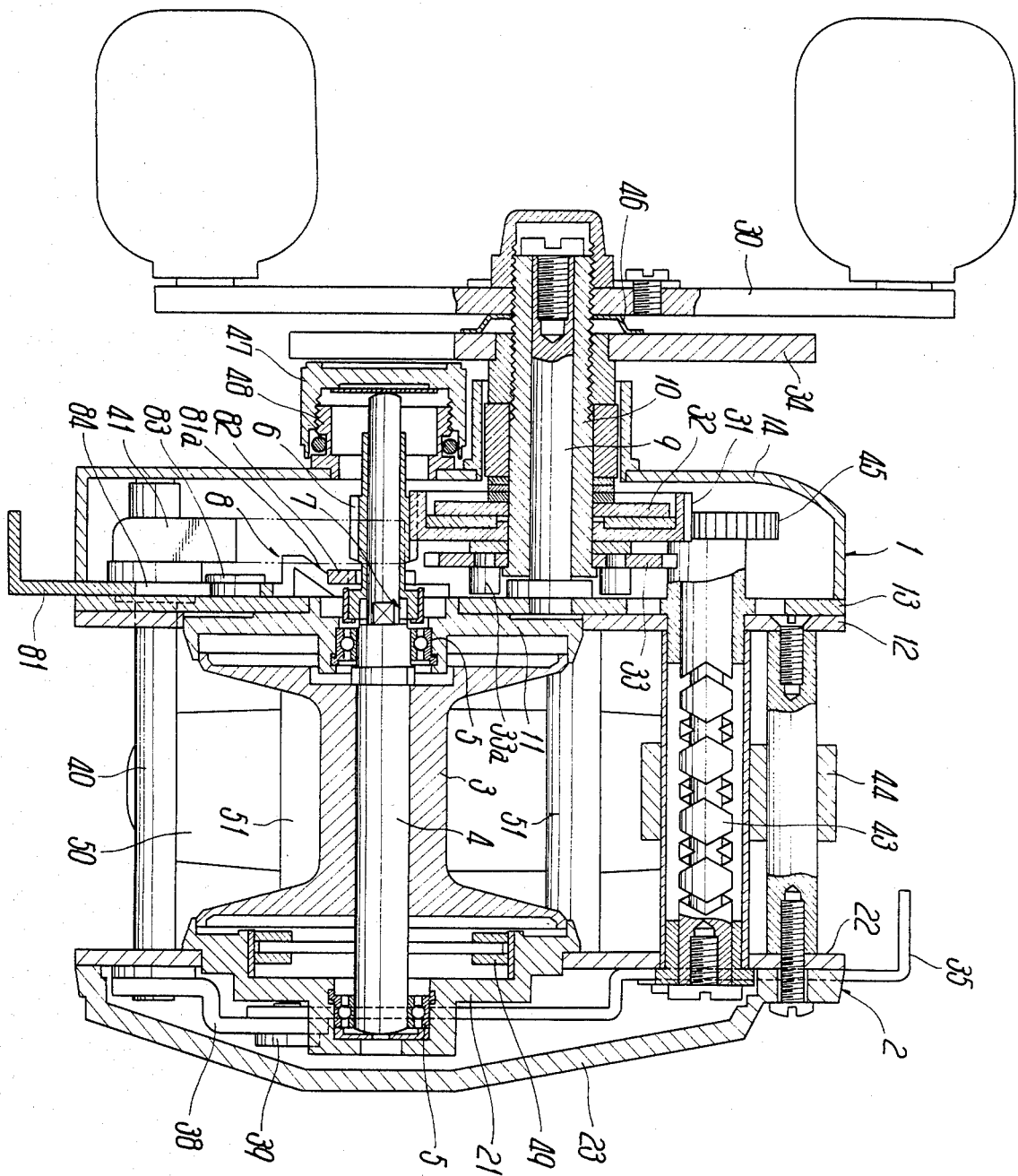
FIG. 1 is a cross-sectional plan view of an embodiment of a fishing reel of the invention.
Figure 2:
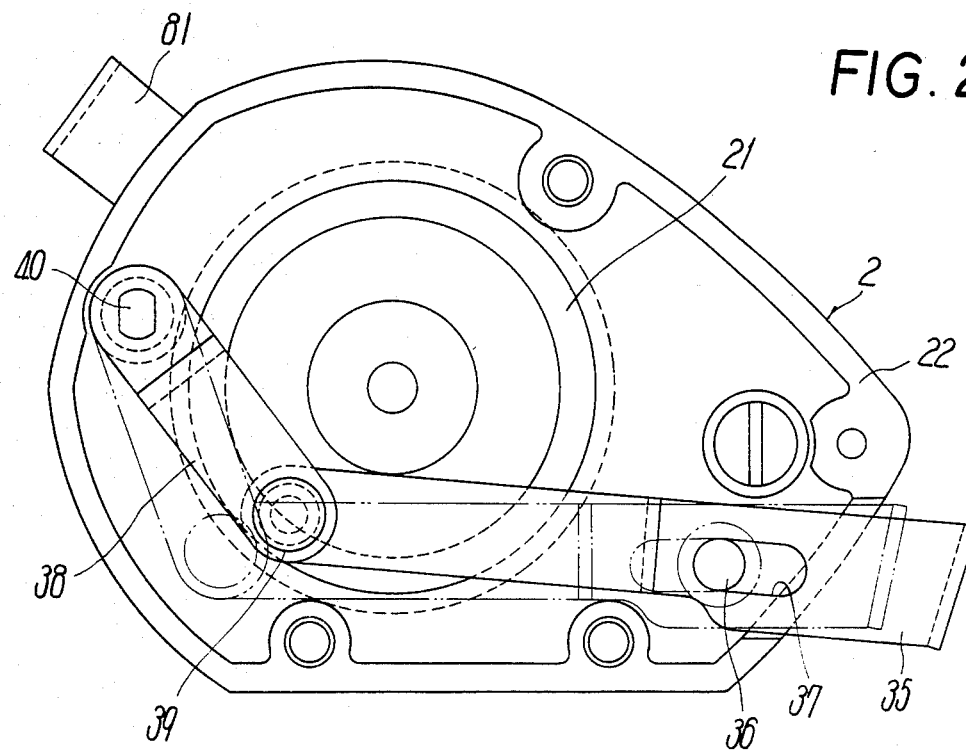
FIG. 2 is a partially omitted right side view of the FIG. 1 embodiment, from which a cover is removed.

Referring to the drawings, a well-known left-hand handle type fishing reel is shown, which is so constructed that a spool 3 having a spool shaft 4 is supported rotatably through bearings 5 to first and second side frames 1 and 2 opposite to each other at a given interval, the first side frame 1 providing a handle to be discussed below, a transmission mechanism including a clutch for transmitting rotation of the handle to the spool 3, and a clutch control mechanism, so that the clutch engages and the handle is turned to rotate the spool 3 to thereby wind up thereon a fishing line, and the clutch disengages to allow the spool 3 to freely rotate.

The first side frame 1 comprises a side plate 12 having at the center a bearing housing 11, an annexed plate 13 attached to the outside of side plate 12, and a cup-shaped cover 14 attached to the annexed plate 13. The second side frame 2 comprises a side plate 22 having at the center a bearing housing 21 and a cup-shaped cover 23 attached to the outside of side plate 22. The bearing housings 11 and 21 hold bearings 5 which rotatably support the spool shaft 4 respectively.

The spool shaft 4 extends at the left axial end and enters into the first side frame 1 to rotatably and slidably support a pinion 6, and a clutch 7 is provided between the pinion 6 and the spool shaft 4 and operated in engagement or disengagement by a clutch lever 81 at clutch control mechanism 8.

A handle shaft 10 is supported between the annexed plate 13 and the cover 14 rotatably through a support shaft 9, projects at one axial end outwardly from the cover 14 to fix the handle 30 at the projecting portion, and supports at the other axial end a master gear 31, a friction plate 32, and a return plate 33 having a plurality of clutch pins 33a.

The friction plate 32 and return plate 33 are fitted not-rotatably onto the handle shaft 10 and rotate together therewith, the master gear 31 being fitted onto the handle shaft 10 to transmit a rotating force from the handle shaft 10 to the master gear 31 through the friction plate 32, and being adjustable by an adjuster 34 in press-contact with the master gear 31, the adjuster 34 screwing with one axial end of handle shaft 10.

The handle shaft 10, master gear 31, friction plate 32, and pinion 6, constitute a transmission mechanism for transmitting the rotation of handle 30 to the spool 3 through the spool shaft 4.

The clutch 7 comprises flat faces provided at an axially intermediate portion of spool shaft 4 and a tubular portion provided at the pinion 6 and having a not-round inner surface engageable with the flat faces, so that the clutch lever 81 at the clutch control mechanism 8 is operated to disengage the tubular portion from the flat faces to thereby allow the spool shaft 4 and spool 3 fixed thereto, to freely rotate.

The clutch control mechanism 8 comprises a clutch yoke 82 which holds the pinion 6 and biases it always in the direction of engaging the clutch 7, bifurcate clutch lever 81 having a biasing portion 81a for biasing the clutch yoke 82, and the return plate 33, the clutch lever 81 being supported to the annexed plate 13 in relation of freely reciprocating perpendicularly to the spool shaft 4 through a pin 83 and an elongate bore 84, and being returned by a return spring 85. The clutch lever 81 is pushed to move the clutch yoke 82 axially of spool shaft 4 to thereby disengage the clutch 7, and the handle 30 is turned to contact the clutch pin 33a at the return plate 33 with a contact 86 provided at the utmost end of clutch lever 81, so that the clutch lever 81 returns by the return spring 85 and the clutch yoke 82 biases the pinion 6 in the direction of engaging the clutch 7. Also, the clutch lever 81 is swingable around the pin 83 fixed to the annexed plate 13 and is provided at the utmost end of one leg with an engaging portion 81b, which portion 81b engages with a stepped portion 15a at a cutout 15 formed at the annexed plate 13, thereby keeping the clutch lever 81 in the end of forward movement thereof. The contact 86 is pivoted to the one leg of clutch lever 81 through a pin 87, biased in the one direction by a sping 88 provided between the pin 87 and the clutch lever 81, and restrained of the movement of contact 86 by a stopper 81c provided at the utmost end of clutch lever 81. It should be noted that it is not indispensable that the clutch lever 81 project outwardly from the first side frame 1 as shown.

In the fishing reel constructed as abovementioned, this invention provides a clutch operating member 35 at the second side frame 2 opposite to the first side frame 1, and an association mechanism in association with the clutch lever 81 and provided across the first and second side frames 1 and 2, so that the clutch operating member 35 is operated to actuate the clutch lever 81, thereby engaging or disengaging the clutch 7.

Figure 3:
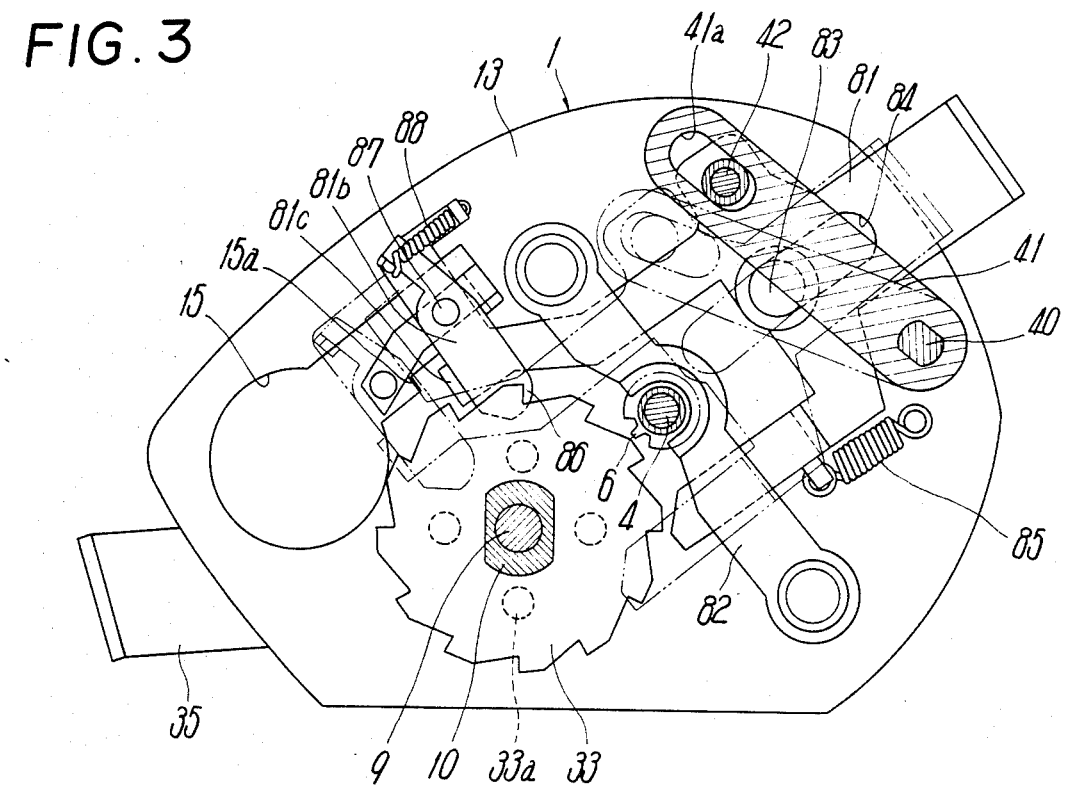
FIG. 3 is a partially omitted longitudinally sectional left side view of the FIG. 1 embodiment.
Figure 4:
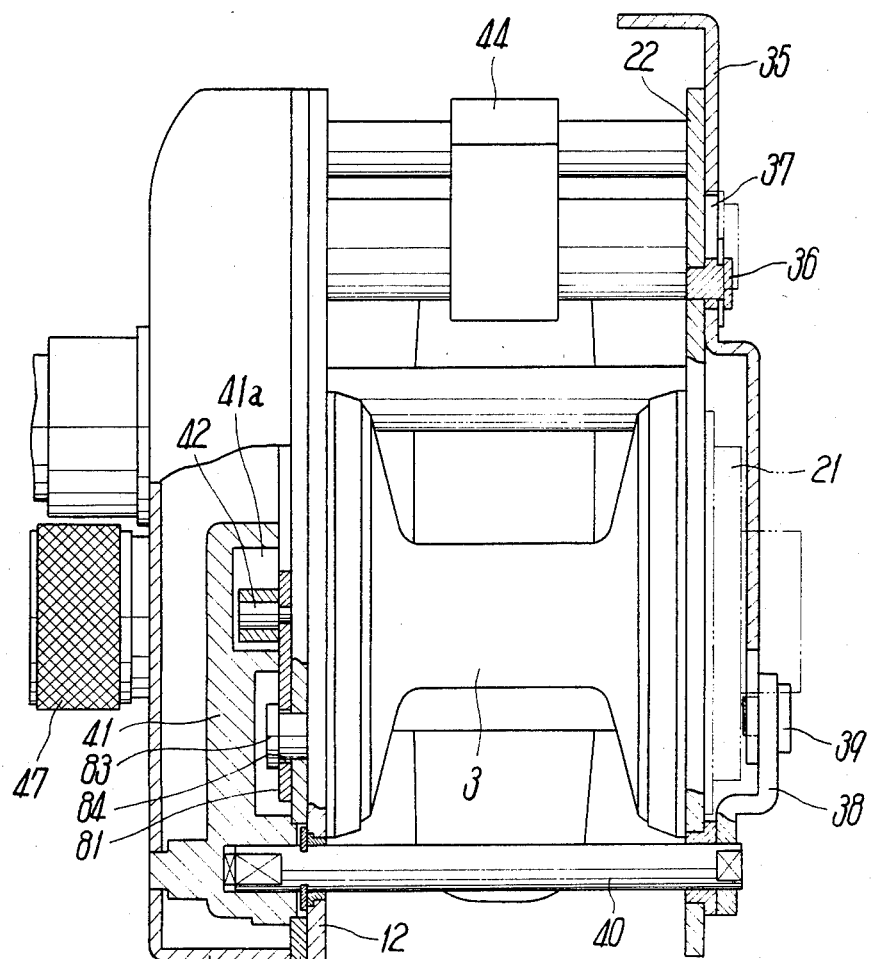
FIG. 4 is a partially cutaway plan view of the same.

The clutch operating member 35 in the embodiment shown in FIGS. 1 through 4 comprises an elongate plate and is supported to the side plate 22 at the second side frame 2 in relation of reciprocating along the side plate 22 through an elongate bore 37 provided at the clutch operating member 35 and a pin 36 provided at the side plate 22 and fitted into the bore 37. Also, the clutch operating member 35 projects at one lengthwise end thereof forwardly outwardly from the second side frame 2 and has at the other lengthwise end a link 38 pivoted thereto through a stem 39. An association shaft 40 is journalled to the first and second side frames 1 and 2, projects through the side plate 12, annexed plate 13, and side plate 22, and extends outwardly from these plates 12, 13 and 22. An association arm 41, as shown in FIG. 3, is connected to a first projecting end of association shaft 40 at a side of the side plate 12 in relation of being not-rotatable relative to the shaft 40, and moves at the utmost end in association with the clutch lever 81 through a pin 42 and an elongate bore 41a. The link 38 is connected at the utmost end thereof to a second projecting end of association shaft 40 at a side of the side plate 22 in relation of being not-rotatable relative to the association shaft 40.

Hence, the clutch operating member 35 is operated to actuate the clutch lever 81 through the link 38, association shaft 40, and association arm 41, so that the clutch lever 81 moves to disengage the clutch 7 to allow the spool 3 to freely rotate for permitting casting.

Next, when the handle 30 is turned, one clutch pin 33a at the return plate 33 hits the contact 86 at the clutch lever 81, so that the clutch lever 81 swings to disengage the engaging portion 81b from the stepped portion 15a and returns by means of a return spring 85. The restoration of clutch lever 81 is transmitted to the clutch operating member 35 so as to restore it. In addition, the clutch operating member 35 alternatively may project upwardly or rearwardly of the reel body.

Referring to the drawings, reference numeral 43 designates a traverse shaft journalled to the side plates 12 and 22, 44 designates a fishing line guide journalled to the traverse shaft 43 and reciprocating axially thereof, 45 designates a transmission gear engaging with the master gear 31 to transmit the rotation of handle shaft 10 to the traverse shaft 43, 46 designates a leaf spring, 47 designates a cast-control supported rotatably to the cover 14 through a cone 48, 49 designates a centrifugal brake provided at the spool shaft 4, and 50 designates a mounting leg attached to connecting rods 51 connecting the first and second side frames 1 and 2.

The fishing reel of the invention constructed as foregoing is mounted onto a reel seat at the fishing rod through the mounting leg 50 and is used for casting or winding the fishing line.

The angler grips the second side frame 2 and fishing rod mainly by his whip hand (the right hand in the embodiment shown in the drawing) and turns the handle 30 by his other hand (the left hand in the embodiment for winding the line). After winding-up the line onto the spool 3, he releases his left hand from the handle 30 and then, for the free rotation of spool 3, operates the clutch operating member 35 at the second side frame 2 by the stretched finger of his whip hand gripping the second side frame 2 and fishing rod, in which he need not shift the grip of the whip hand, thereby performing a quick and easy casting.

Furthermore, there is no fear that the handle 30 hinders the angler's hand from operating the clutch 7 or an unnatural grip of his hand is required, because the clutch operating member 35 is operated by his whip hand gripping the second side frame 2. As a result, the angler can operate the clutch 7 for casting while gripping the second side frame 2 and rod in a steady condition.

When he intends to wind the line after the casting, he, by his left hand, turns the handle 30 to engage the clutch 7 while his right hand continues to grip the second side frame 2 and rod, so that the spool 3 rotates through the transmission mechanism to wind the line on the spool 3.

Alternatively, the fishing reel of the invention may be of a left-hand handle type, in which a first side frame corresponds to the right side frame and a second side frame to the left side frame in FIG. 1. Also, the first and second side frames 1 and 2 may be integral.

Figure 5:
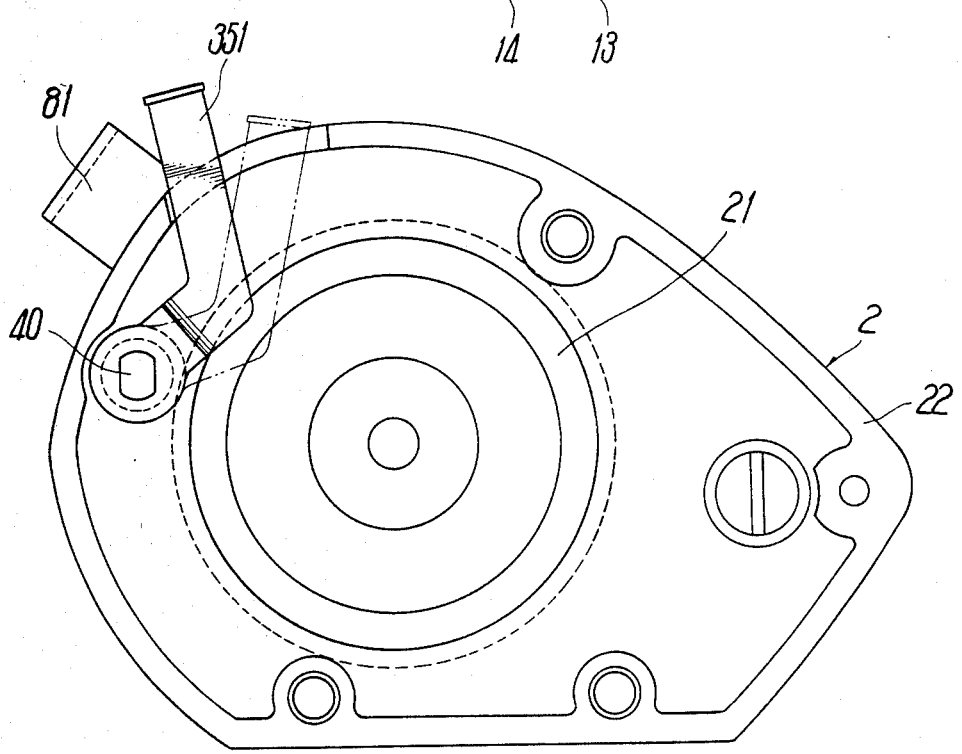
FIG. 5 is a partially omitted right side view of a modified embodiment of the invention, corresponding to FIG. 2.

The clutch operating member 35 alternatively may, as shown in FIG. 5, be of a lever type. Such clutch operating lever 351 is connected directly to and not-rotatable relative to the second projecting end of association shaft 40 at a side of second side frame 2, thereby swinging around the axis of association shaft 40. In this instance, the link 38 is unnecessary, so that the reel is simple in construction.

In addition, the clutch operating lever 351 in the FIG. 5 embodiment of course projects at its free end outwardly from the cover 23 at the second side frame 2.

As seen from the above, the fishing reel of the invention enables the angler to grip the reel together with the rod by his hand which is not used for operating the handle and operate the clutch by said hand, so that he need not shift his grip for the casting and clutch operation, thereby ensuring quick and easy casting.

Although several embodiments have been described, they are merely exemplary of the invention and not to be constructed as limiting, the invention being defined solely by the appended claims.

What is claimed is:

1. A fishing reel comprising:
first and second side frames;
a spool supported rotatably between said side frames;
a handle supported rotatably to said first side frame;
a transmission mechanism including a clutch for transmitting rotation of said handle to said spool, and
a clutch control mechanism having a clutch lever for engaging or disengaging said clutch, said second side frame opposite to said first side frame being provided with a clutch operating member, said first and second side frames being provided with an association mechanism including an association shaft journalled between said side frames for mechanically coupling said clutch operating member with said clutch lever so that operation of said clutch operating member causes said clutch control mechanism to operate said clutch, said clutch lever projecting outwardly from said first side frame, so that the projecting portion of said clutch lever also is operable to cause said clutch control mechanism to operate said clutch, said first and second side frames being provided with side plates and covers respectively, said association shaft being journalled to said side plates at said first and second side frames and projecting at both axial ends thereof outwardly from said side plates respectively, and having an association arm at a first projecting axial end of said association shaft at a side of said first side frame, said association arm being connected with said clutch lever, said clutch operating member being connected with said projecting axial end of said association shaft at a side of said second side frame.

2. A fishing reel comprising:
first and second side frames;
a spool supported rotatably between said side frames;
a handle supported rotatably to said first side frame;
a transmission mechanism including a clutch for transmitting rotation of said handle to said spool, and
a clutch control mechanism having a clutch lever for engaging or disengaging said clutch, said second side frame opposite to said first side frame being provided with a clutch operating member, said first and second side frames being provided with an association mechanism including an association shaft journalled between said side frames for mechanically coupling said clutch operating member with said clutch lever so that operation of said clutch operating member causes said clutch control mechanism to operate said clutch, said first and second side frames being provided with side plates and covers respectively, said association shaft being journalled to said side plates at said first and second side frames and projecting at both axial ends thereof outwardly from said side plates respectively, and having an association arm at a first projecting axial end of said association shaft at a side of said first side frame, said association arm being connected with said clutch lever, said clutch operating member being connected with a second projecting axial end of said association shaft at a side of said second side frame, said clutch operating member being connected to the second projecting axial end of said association shaft so as to be nonrotatable relative to said association shaft, and being supported to said second projecting axial end of said association shaft so as to be swingable around the axis of said association shaft, said clutch operating member projecting at a free end outwardly from said second side frame.

3. A fishing reel according to claim 2, wherein said clutch operating member is supported movably in reciprocation to said side plate at said second side frame, so that the outer end of said clutch operating member in the direction of reciprocation thereof projects outwardly from said second side frame, and a link is supported pivotably to the inner end of said clutch operating member, said link being connected to said second projecting axial end of said association shaft in relation of being not-rotatable relative to said association shaft.

* * * * *